United States Patent
Massoels (10) Patent No.: US 9,157,465 B2
(45) Date of Patent: Oct. 13, 2015

(54) FIXATING COMPONENT FOR A FIXTURE

(75) Inventor: Jo Massoels, Sint-Truiden (BE)

(73) Assignee: MATERIALISE N.V., Leuven (BE)

( * ) Notice: Subject to any disclaimer, the term of this patent is extended or adjusted under 35 U.S.C. 154(b) by 283 days.

(21) Appl. No.: 13/639,324

(22) PCT Filed: Apr. 29, 2011

(86) PCT No.: PCT/EP2011/056865
§ 371 (c)(1),
(2), (4) Date: Oct. 4, 2012

(87) PCT Pub. No.: WO2011/135087
PCT Pub. Date: Nov. 3, 2011

(65) Prior Publication Data
US 2013/0031753 A1 Feb. 7, 2013

(30) Foreign Application Priority Data
Apr. 29, 2010 (GB) .................... 1007257.7

(51) Int. Cl.
| | | |
|---|---|---|
| *B25B 27/14* | (2006.01) | |
| *F16B 21/07* | (2006.01) | |
| *B23P 9/00* | (2006.01) | |
| *B23K 37/04* | (2006.01) | |
| *B23Q 3/10* | (2006.01) | |

(52) U.S. Cl.
CPC ........... *F16B 21/073* (2013.01); *B23K 37/0408* (2013.01); *B23P 9/00* (2013.01); *B23Q 3/103* (2013.01); *Y10T 24/44026* (2015.01); *Y10T 29/49769* (2015.01)

(58) Field of Classification Search
USPC ....................................... 29/281.1
See application file for complete search history.

(56) References Cited

U.S. PATENT DOCUMENTS

| | | | | |
|---|---|---|---|---|
| 2,055,257 A | * | 9/1936 | Maynard et al. ........... | 72/409.02 |
| 2,178,391 A | * | 10/1939 | Curtiss ...................... | 72/409.02 |
| 2,194,748 A | * | 3/1940 | Glaser et al. ............... | 72/409.04 |
| 3,109,214 A | * | 11/1963 | Clay ........................... | 411/349 |
| 3,945,238 A | * | 3/1976 | Eckert ....................... | 72/409.03 |
| 4,215,468 A | * | 8/1980 | Greco ........................ | 29/764 |

(Continued)

FOREIGN PATENT DOCUMENTS

| | | |
|---|---|---|
| EP | 0181768 A1 | 5/1986 |
| GB | 1401352 A | 7/1975 |

(Continued)

OTHER PUBLICATIONS

International Search Report, dated Aug. 29, 2011 for PCT Application No. PCT/EP2011/056865.

(Continued)

*Primary Examiner* — Lee D Wilson
*Assistant Examiner* — Alvin Grant
(74) *Attorney, Agent, or Firm* — EIP US LLP (57) ABSTRACT

The present invention relates to a fixture and/or locator for supporting and positioning and/or calibrating an object comprising a male or female portion of an interlock mechanism, the fixture and/or locator comprising: at least one fixating (2) component for holding the object in a fixed position, characterized in that, the at least one fixating component comprises a locking element (3) configured for receiving the male portion and a release element (4) for releasing the male or female portion from the locking element by actuating the release element.

14 Claims, 9 Drawing Sheets

(56) References Cited

U.S. PATENT DOCUMENTS

| | | |
|---|---|---|
| 4,313,333 A | 2/1982 | Malagnoux et al. |
| 5,100,272 A | 3/1992 | Jadoul et al. |
| 5,141,680 A | 8/1992 | Almquist et al. |
| 5,192,539 A | 3/1993 | Van Der Marel et al. |
| 5,666,709 A | 9/1997 | Suzuki |
| 6,178,611 B1 | 1/2001 | Boe |
| 6,938,453 B2 * | 9/2005 | Pickup et al. ............... 72/409.04 |
| 8,033,810 B2 * | 10/2011 | Helenius et al. .............. 425/190 |
| 2005/0244217 A1 | 11/2005 | Burke et al. |

FOREIGN PATENT DOCUMENTS

| | | |
|---|---|---|
| JP | 5338771 A | 12/1993 |
| WO | 0211945 A1 | 2/2002 |
| WO | 2005073566 A1 | 8/2005 |

OTHER PUBLICATIONS

International Preliminary Report on Patentability, dated Aug. 3, 2012 for PCT Application No. PCT/EP2011/056865.

* cited by examiner

FIXATING COMPONENT FOR A FIXTURE

CROSS-REFERENCE TO RELATED APPLICATIONS

This application is a U.S. national phase of PCT Application No. PCT/EP2011/056865, filed Apr. 29, 2011, which claims priority to British Application No. 1007257.7, filed Apr. 29, 2010.

FIELD OF THE INVENTION

The present invention relates to fixtures and/or locators with fixating components for holding objects making use of locking features present on the object. The invention is particularly of interest for mounting, measuring and/or the quality control of objects made e.g. in production lines such as for instance in the automobile industry.

BACKGROUND OF THE INVENTION

In the automotive industry there is an increased tendency to make use of locking features, such as but not limited to clips and snap-fits in the assembly of car parts. This tendency is driven by the need for easier and faster assemblies to reduce takt times of producing cars and the fact that such fasteners contain the inherent advantage that they are product specific and thus guaranty an after-sales network for repairs. The consequence is that, with regard to testing and quality control of automotive parts, these connection means should be taken into account in order to simulate as much as possible the real assembly situation.

Measurement of a production part without taking into account the connection means implies that the measurement is not exactly representative of the part in its envisaged final position, after assembly. Moreover, with irregular shaped plastic parts, which deform easily and are often difficult to fix properly, measurements are often inaccurate and irreproducible.

While quality control is of high importance in production lines, the quality control for these connection means themselves is at present, inexistent or unsatisfactory. Indeed, in current assembly processes the quality control of snap-fit connection means takes place when the car part is placed in its final assembly position. However, not only is the removal of parts which are unsatisfactory from the final assembly labor-intensive, but testing further down in the production line does not allow rapid correction in production.

Accordingly there is a need in the art for improved fixtures and/or locators for quality control of production parts. Quality control procedures should be relatively inexpensive, without generating sizable quantities of waste, and should require a limited amount of time. It is accordingly one of the aims of the present invention to overcome or ameliorate at least one of the disadvantages of the prior art, or to provide a useful alternative.

SUMMARY OF THE INVENTION

It has now been found that quality control procedures for parts comprising locking features such as but not limited to spring-fasteners, clips and snap-fits can be optimized by providing a fixture and/or locator for supporting and positioning and/or calibrating an object, comprising an improved fixating component.

The fixtures and/or locators of the present invention allow for functional use and/or testing of the locking feature provided on an object or piece and as such allow accurate measurement and quality control of the entire part in its envisaged final position, without requiring assembly. Moreover, this can avoid problems with irregular shaped plastic parts, which deform easily and are often difficult to fix properly for quality control.

In a first aspect the invention provides locators for use in supporting and/or positioning a piece comprising a locking feature. More particularly the locators according to the invention are characterized in that they comprise at least one fixation component capable of reversibly interlocking with a locking feature present on the object. In this way the object is held by the locator.

In particular embodiments the locking feature present on the object is the male or female portion of an interlock mechanism.

In further particular embodiments of the invention the interlock mechanism is a spring fastener, snap-fit, click fingers, snap lock, snap clip mechanism.

In particular embodiments of the fixtures and/or locators according to the invention, the interlock between the fixation component and the locking feature can be released by a force input acting on said fixation component. More particularly, the force input is a pneumatic, hydraulic, mechanical, electrical or electro-magnetic force.

In particular embodiments of the fixtures and/or locators according to the invention, the fixation component comprises a locking element with integrated releasing element.

In other embodiments of the fixtures and/or locators according to the invention, the at least one fixation component of the locator comprises a locking element configured for receiving the locking feature present on the piece and a release element for releasing the locking feature from the locking element by actuating the release element. In particular embodiments of the fixtures and/or locators according to the invention, the locking feature is the male portion of an interlock and the fixation component comprises a locking element for receiving the male portion of the interlock and a release element whereby the male portion can be released from the locking element. In alternative embodiments of the fixtures and/or locators according to the invention, the at least one fixation component comprises a locking element functioning as the male portion of the interlock mechanism and is configured to fit into a female portion of the interlock mechanism present on the piece and a release element for releasing the female portion from the locking element by actuating the release element.

In further particular embodiments of the locators according to the present invention, the release element comprises at least one spring such that a two-way linear movement can be provided by a one-way force input.

In particular embodiments of the invention, the locators comprising the fixation component according to the invention are made of a single material. In further particular embodiments of the invention, the locators and/or fixtures are made of one piece, more particularly by additive manufacturing. In further particular embodiments the fixation components of the fixtures and/or locators according to the invention are reinforced at least in part with a layer of highly durable material or by local hardening.

In particular embodiments of the invention, locators are provided which further comprise at least one surface which mates with a surface of the piece. More particularly, the surface matching the surface of the piece is based on a 3-dimensional image of said piece. Most particularly the surface is a surface which mates specifically with said piece (i.e. does not mate with another surface of said piece). In further particular embodiments, the surface is a surface which mates with a surface unique to the piece. In further particular embodiments said surface ensures a physical constraint of the movement of said piece.

Typically, the surface is a surface located on or near the locking feature present on the piece and is unique to this area around the locking feature of the piece.

A further aspect of the invention relates to supporting and/or reference constructions for supporting and positioning and/or calibrating a piece, which supporting and/or reference constructions comprise a base structure and one or more structural elements, of which at least one comprises a locator according to the invention. More particularly, the invention provides supporting and/or reference constructions for supporting and/or positioning a piece comprising a locking feature, wherein at least one of structural elements comprises at least one fixation component according to the invention as described herein, optionally comprised in a locator. More particularly at least one of the supporting and/or reference structures comprises at least one locator for supporting and/or positioning a piece which is a piece comprising a locking feature. The precision fixture(s) and locator(s) is(are) characterized in that it(they) comprise at least one fixation component interlocking with a locking feature of the piece, thereby capable of reversibly holding the locking feature, and thus the object, optionally fixing it in a particular position. The one or more locators present on the supporting and/or reference constructions for supporting and/or positioning a piece may further be characterized by one or more of the features as described hereinabove.

In particular embodiments, the supporting and/or reference construction according to the invention are characterized in that the position of the one or more locators is determined based on a digital description of said the piece to be held and optionally, a desired positioning thereof.

In yet a further aspect, the invention relates to the use of locators and precision fixtures as described herein and/or a supporting and/or reference construction as described herein, for calibrating, inspecting, checking, assembling or any other processing of a piece. In particular embodiments the locators and/or supporting structures are used for machining and/or welding of the piece. In particular embodiments the fixtures and/or locators and/or supporting structures are used for measuring and/or controlling particular features of the piece.

Accordingly, this aspect provides improved methods for inspecting, checking, assembling or performing other manipulations on a piece, which involve the steps of reversibly fixing the piece by way of at least one locator according to the invention. The present invention further provides improved methods for inspecting and checking or performing other manipulations on a piece comprising a locking feature, such as a male portion of an interlock mechanism, which allow positioning of the piece in a position which mimics the position of the piece upon assembly. In particular embodiments, the methods involve inspecting and/or checking of the interlock mechanism and/or the male part present on the piece.

BRIEF DESCRIPTION OF THE FIGURES

FIG. 1 (A) illustrates the principle of releasing an interlock mechanism which is a typical automotive clip; (B) represents a view in perspective of a locator with fixation means according to a particular embodiment of the invention, wherein the interlock mechanism is the same typical automotive clip and wherein the locator comprises an integrated release element which can be actuated to release the male portion of the automotive clip and wherein the release mechanism comprises a spring;

FIGS. 7 A and B represent schematic representations of a cross-section of a fixation component according to a particular embodiment of the invention wherein the fixation means comprises a locking element with integrated releasing element, i.e. in the way of springs.

List of reference numerals used in the Figures. Each of these illustrations represents particular embodiments of the features concerned and the corresponding features are not to be interpreted as limited to this specific embodiment.

(1) locator; (2) fixation component; (3) locking element; (4) release element; (5) opening; (6) ridge; (7) spring; (8) moveable member; (9) lever (20) supporting and/or reference construction; (21) fixture members; (22) base structure; (23) cable system; (24) control box; (25) lever; (3') locking element with integrated release element; (30) reference surface.

(A) Male portion of an interlock; (a) tongue portion; (b) wedge; (c) cap; (P) piece.

DETAILED DESCRIPTION OF THE INVENTION

The terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In a first aspect the invention provides an improved locator for supporting and positioning and/or calibrating an object.

As used herein, the term "piece" relates to any object or part thereof including prototyping, pre production and production parts.

As used herein, the term "fixture" refers to a device which allows fixation or holding of a piece or a part thereof, typically used in the manufacturing industry. A fixture refers more specifically to a device for locating, holding and supporting a piece during a specific operation. Fixtures are essential elements of production processes as they are required in most of the automated manufacturing, inspection, and assembly operations. Fixtures are typically used to correctly locate a piece in a given orientation with respect to a cutting tool or measuring device, or with respect to another component, as for instance in assembly or welding. Such location must be invariant in the sense that the devices must clamp and secure the piece in that location for the particular processing operation and/or must allow repeated presentation of subsequent identical pieces in the same position. Generally, the fixture comprises a fixture body, the major structural element of the fixture, onto which one or more fixed or adjustable elements are provided that serve to prevent or constrain deformation of the piece, whereby one or more of these elements is provided with a locator, which ensures a reversible attachment of the piece to the fixture.

As used herein, the term "locator" refers to the end component of a fixture-element which is used to actually ensure contact with the piece and to establish and maintain the position of a piece in the fixture by constraining the movement of the piece. A locator (also sometimes referred to as end-affector, top-ends or precision-fixture in the art) refers more specifically to a connection piece which ensures that the connection between the fixture and the piece.

Thus, locators are typically mounted on supporting and/or reference structures or fixture elements which themselves are mounted on a base plate or beam structure (also referred to as "fixture body").

A "support" as used herein refers to a fixed or adjustable element which supports the piece but does not actively hold it. Additional supports can be added and placed below a piece to prevent or constrain deformation.

A "clamp" as used herein refers to a part of a fixture and/or locator which makes use of a force-actuating mechanism to hold the piece. It can be distinguished from the fixation components according to the present invention in that it does not mimic the interlock corresponding to a locking feature present on the piece, but rather independently secures the piece by exerting its clamping force on the piece. As used herein, the term "locking feature" as present on an object or piece relates to a feature which is used, upon assembly or use of the piece, for fixing the piece onto another object or fastening something onto the piece. Typically a locking feature is the male or female portion of an interlock mechanism.

As used herein, the term "interlock mechanism" refers to a mechanism of two mating elements, which ensure a tight fit. The interlock mechanism typically includes one element ("male portion") which fits into or latches onto another interlocking element ("female portion"). When two objects are provided with respectively either the male or the female portion of the interlock they can be assembled to ensure a tight fit between them and/or the interlock can be used to secure a third item. Optionally, one of the interlock elements is provided as a fastener. A non-limiting list of examples of interlock mechanisms include, but are not limited to, spring fasteners, snap-fits, click fingers, snap locks, snap clip mechanism (such as typical automotive clip mechanisms), plastic clips, push-in clips or fasteners, arrow clips, grommets, rivets, removable rivets, snap rivets etc.

As used herein, the term "actuating" refers to applying a force such as to ensure the desired motion. This term is used herein with reference to a releasing element of the fixation component. Actuating the releasing element results in the desired motion of the releasing element thereby ensure release of the male portion from the fixation component.

The present invention relates to devices and methods for holding objects and optionally fixing objects in a desired position, more particularly whereby the object comprises a locking feature and the locking feature is involved in the holding of the object. More particularly the present invention relates to tools and methods which allow reversible fixation of objects based on a part of an interlock mechanism provided thereon. This differentiates the devices and methods of the present invention from traditional systems, which involve clamps which secure an object, irrespective of the nature of the locking features present thereon. The securing of an object by making use of the locking feature(s) present thereon not only allows repeatable accurate positioning of the object in a situation simulating the functional use of the object, such as the real assembly situation, but allows repeatable and accurate measurement of the object.

A first aspect of the invention relates to locators for supporting and/or positioning a piece which comprises a locking feature. The locators of the present invention allow stable and reproducible fixation of a piece on a fixture by making use of the locking feature present on the piece.

Typically the locking feature present on the piece is one portion of an interlock mechanism. Thus, the locators according to the present invention comprise at least one fixation component interlocking with a locking feature present on the piece. In particular embodiments the fixation component of the locator simulates the complementary portion of the interlock mechanism. The fixation component of the fixtures and/or locators according to the invention is capable of reversibly holding the locking feature, and thus the object. Optionally, the object can be held in a particular fixed position.

In particular embodiments, the fixation component is flexible, i.e. it can be moved to a different position for/during engagement with the locking feature present on the piece, and interlocks with the locking feature by returning to its original position. Alternatively, the locking feature present on the piece is flexible and can be moved to a different position for/during engagement with the fixation component of the locator, and interlocks with the fixation component by returning to its original position. In particular embodiments, both the fixation component and the locking feature present on the piece are flexible and can be moved in a different position for/during engagement with each other to accomplish the interference required to latch the components together (The First Snap-Fit Handbook, Bonenberger, 2000).

In particular embodiments, the piece comprises the male portion of an interlock and the locator and/or fixture comprises a fixation component interlocking with the male portion. Indeed, in particular embodiments the fixation component is provided within the casing of the locator, such that only the opening of the fixation component is visible from the outside of the locator.

Alternatively, the piece comprises the female portion of an interlock and the locator and/or fixture comprises a fixation component interlocking with the female portion. However, the locators and/or fixtures of the present invention are further characterized in that the locking feature is held reversibly by the fixation component. Thus the locators and/or fixtures of the present invention provide an integrated release mechanism which ensures that the fixation of the piece on the locator and/or fixture is reversible without requiring additional tools. In particular embodiments the release mechanism is such that it does not require exerting force on the piece itself.

The nature of the interlock mechanism provided on the piece of interest is not critical. In particular embodiments, the locking feature present on the piece is part of an interlock which is designed to be reversible.

In particular embodiments, the locking feature present on the piece is part of an interlocking mechanism which is designed for a permanent fit. Suitable examples include, but are not limited to snap-fit, click fingers, snap lock, snap clip mechanisms, plastic clips, push-in clips or fasteners, arrow clips, grommets, rivets, removable rivets, snap rivets and the like. Typically, but not necessarily in these embodiments, either all or part of the male portion of the interlocking mechanism is at least in part deformable which allows latching into a depression or groove of the female portion.

It is noted that the nature of the nature of the fixation component of the locators and/or fixtures according to the invention need not correspond to the nature of the interlock for which the locking feature present on the object is designed. Indeed, while the locking feature may be designed for use in a permanent fit interlock upon assembly and/or use of the object, the fixation component of the locators and/or fixtures according to the present invention is typically reversible. This can be ensured in different ways.

The locking component of the locators and/or fixtures according to the present invention is designed to hold the locking feature of the object or piece. In particular embodiments the locking feature is held in a fixed position, i.e. once the locking feature interlocks with the fixation component, it can no longer be moved in any direction. In alternative embodiments, the locking component is designed such that after interlock with the locking feature on the object, the locking feature can still move in one or more directions. In particular embodiments, only unilateral movement of the locking feature remains possible after interlocking with the locking component. The latter may be of interest where limited movement of the object during holding by the fixture and/or locator is desirable, e.g. for accurate positioning for measurement or with respect to another object.

The fixation components according to the present invention may comprise locking elements which in fact contain an integrated releasing element or a separate release element which reverses or counters the function of the locking element.

According to particular embodiments, the locators and/or fixtures of the invention comprise a fixation component which contains a locking element in which the releasing element is integrated. According to particular embodiments, the fixation component is designed so as to allow releasable holding of the object by the locking element. In particular embodiments this implies that introduction and release of the locking feature into the fixation component require similar force. This can be ensured, e.g. by providing the locking element of the fixation component with one or more springs, which are depressed upon exerting pushing or pulling force on the locking feature. Accordingly, where the piece comprises a male portion of an interlock, introduction thereof into the locking element ensures compression of the springs of the locking element. The male portion is held tightly by the force of the springs. In particular embodiments the male portion and the locking element are designed such that the male portion can be easily pulled out of the locking element, e.g. by exerting a force perpendicular to the force of the springs. This can be a pulling force on the male portion or the object. Optionally, the force can be a pushing force provided in the locator by a power source. According to these embodiments, the locator and/or fixture further comprises a force input for receiving a force from an external source. The nature of the force is not critical and may be pneumatic, hydraulic, mechanical, electrical or electro-magnetical force.

According to particular embodiments, the locators and/or fixtures of the invention comprise a fixation component which comprises a locking element configured for receiving the male or female portion of an interlock mechanism and a separate release element for releasing the male, respectively female portion from the locking element. The nature of the locking element is determined by the nature of the interlocking mechanism, and more particularly by the design of the portion of the interlocking mechanism provided on the piece or object. Typically, the presence of a separate release element is envisaged in fixation components whereby release of an interlock mechanism or locking feature designed for permanent fit is required. For instance, where the interlocking mechanism is a cantilever snap-fit, and the piece comprises the male portion of the interlock, this male portion typically comprises a tongue with a hook-like structure. Typically the corresponding locking element is a fixed part and comprises an opening which allows insertion of the hook-like structure and at least part of the tongue of the male portion of the interlock mechanism and a recess or edge, which mates with the hook of the male portion. A snap fit with a 90° hook and a 90° recess is typically designed for a permanent fit as the hook can not be retracted from the recess after it has been inserted. Typically, introduction of the male portion of the interlock into the locking element ensures an interlock, similar to the interlock in which the male portion of the piece will fit upon use or assembly of the piece.

The separate release element of the fixation component according to these embodiments of the invention is typically a moveable part. In its resting position, the portion of the interlock provided on the piece (i.e. locking feature) is maintained interlocked with the locking element of the fixation component. The movement of the release element ensures the release of the locking feature present on the piece from the locking element. The nature of the release element is also determined by the nature of the interlock but can vary depending on the force that is used to ensure actuation or movement of the release element. For instance, where the interlock mechanism is a cantilever snap-fit, the release element may comprise an additional beam or lifter structure which can be pressed against the tongue of the male portion when present in the locking element so as to remove the hook from its locked position. In particular embodiments the release element is designed such that force can be applied manually. In more particular embodiments this implies the presence of a button or leaver on which a manual force (typically through one or more fingers) can be applied, resulting in the movement of the release element. Alternatively, the release element is designed such that the movement is ensured by a force which is led to the release element from a power source, optionally by way of a cable. Typically mechanical cable systems commonly known in the art such as Bowden cables are used for this purpose. Accordingly, in particular embodiments, the release element comprises a force input for receiving a force from an external source. The nature of the force is not critical and may be pneumatic, hydraulic, mechanical, electrical or electromagnetical force. Different release elements may be connected to one central power source and controlling unit which allows consolidation of the control of different fixation component.

The separate release element integrated in the fixation component according to the invention has the advantage that the interlock can be released and the object removed from its locking position without applying force on the object. In particular embodiments the fixation component further comprises one or more springs. In more particular embodiments the spring(s) can be comprised within the release element. In more particular embodiments a spring ensures that a two-way linear movement can be provided by a one-way force input.

In particular embodiments, the spring in the fixation component is designed such that the spring is compressed by the force of the interlocking of the locking feature present on the piece with the locking element. More particularly, where the piece comprises the male portion of an interlock, insertion of the male portion into the locking element may result in a compression of the spring present in the fixation component. Releasing of the spring (directly, by removal of the locking feature or as a result of actuating the release element) ensures a movement in the opposite direction, i.e. a pushing the locking feature present on the piece out of the fixation component.

In particular embodiments, the fixation component comprises a spring and a separate release element which requires actuation. Without actuation of the release element, the male portion is maintained in the locked position by the locking element. However, upon actuation of the release element, e.g. of a lifter beam, the force of the spring will help ensure release of the object.

In particular embodiments of the fixation components according to the present invention, the locking feature is held in a specific position by the locking element of the fixation component. This is ensured by providing a locking element which allows limited movement of the locking feature after introduction into the locking element. In particular embodiments this is ensured by a locking element which interlocks with the locking feature of the object in more than one orientation, such that movement in different directions is blocked. In particular embodiments of the invention, the locking element is designed to interlock in different directions with a locking feature present on apiece which is a male portion of an interlock which has a circular cross-section and comprises an extrusion around it circumference which functions as a hook.

In alternative embodiments, the locking element, while ensuring that the locking feature can not be removed from the fixation component without applying additional pressure, nevertheless allows limited movement of the locking feature within the locking element. More particularly, movement in a direction which is perpendicular to the orientation of the locking feature in the fixation component may still be possible. This is ensured by providing a locking element with an opening which is larger than the size of the locking feature in one direction. In particular embodiments the locking feature is the male portion of an interlock and the fixation component allows movement of the male portion after its introduction into the fixation component. In particular embodiments, such as where the male portion is a cantilever hook, the male portion may comprise hook-like structures only on one surface or only on two opposite sides of a flattened tongue-like structure. In these embodiments, a corresponding fixation component may allow movement by way of a locking element with an elongated slot, which allows lateral movement of the tongue after introduction into the locking element. In further particular embodiments, the locking element comprises springs which clamp the male portion in one orientation, but not in the orientation perpendicular thereto.

The locators of the present invention are typically for use on a fixture. This typically implies that the locator comprises a fixture-assembly feature, which allows the assembly of the locator onto a fixture. Examples of fixture-assembly features include but are not limited to holes, pins, ridges, slots, clamps, etc. . . . The nature of the fixture-assembly feature is not critical to the present invention.

The present invention provides locators comprising one or more of the fixation components described herein, which allow reversibly holding a piece, optionally in a fixed position. The fixtures and/or locators according to the invention may further comprise one or more mating surfaces which mate with a surface of the piece. This ensures correct positioning of the piece on the fixtures and/or locators. Typically, the mating surface of the locator is designed based on a 3-dimensional image of the piece and its desired position on the fixture. Most particularly the surface is a surface which mates specifically with said piece (i.e. does not mate with another surface of said piece). Most particularly, the surface of the piece which mates with the mating surface is specific or unique for the piece, such that mating can be ensured only between the mating surface and its corresponding surface.

This ensures a unique positioning of the piece relative to the locator. In particular embodiments said surface ensures a physical constraint of the movement of said piece relative to the locator.

The one or more mating surfaces are in particular embodiments located on a part of the locator which is different from the fixation components. However, they can also be part of the fixation component.

In particular embodiments, the locator according to the present invention comprises one or more reference surfaces or points on which the piece which is to be held will rest or which further fix the piece in a specific position. These reference surfaces, which can be mating surfaces are pre-determined and will determine the position in which the piece is held by the fixture, for the purpose of measurement or particular processing steps. In particular embodiments the position of the reference surfaces simulates the position of the piece or object upon use, e.g. upon assembly with other parts.

Accordingly, in particular embodiments, the locators according to the present invention are designed based on a 3-dimensional image of the piece and its desired position on the fixture so as to contain reference surfaces or points, which determine the position of the piece when held in the fixture. Such reference surfaces or points include both actual reference surfaces such as those described above, which are mating surfaces present on the locators. Additionally or alternatively the locators according to the invention may also be designed to have specific virtual reference surfaces or points. More particularly, such virtual reference points or surfaces are determined by the locking elements of the fixation component, e.g. more particularly by the nature and position of the springs therein. These determine the position of the locking feature of the piece, and thus of the piece itself. The reference surfaces and points described above can be used for calibration purposes.

According to particular embodiments, the fixation component and optionally the locators comprising the fixation component integrated therein according to the present invention are made of a single material. Most particularly, the fixation component is made of one piece. In further particular embodiments, the fixation component are made by additive manufacturing techniques, also referred to as layered manufacturing techniques or material deposition manufacturing techniques.

In particular embodiments, Rapid Prototyping and Manufacturing (RP&M) techniques are used for manufacturing the actuators of the invention. Currently, a multitude of Rapid Prototyping techniques is available, including stereo lithography (SL), Laser Sintering (LS), Fused Deposition Modeling (FDM), foil-based techniques, Direct Metal Laser Sintering (DMLS) etc.

A common feature of these techniques is that objects are typically built layer by layer. Stereo lithography, presently the most common RP&M technique, utilizes a vat of liquid photopolymer "resin" to build an object a layer at a time. On each layer, an electromagnetic ray, e.g. one or several laser beams which are computer-controlled, traces a specific pattern on the surface of the liquid resin that is defined by the two-dimensional cross-sections of the object to be formed. Exposure to the electromagnetic ray cures, or, solidifies the pattern traced on the resin and adheres it to the layer below. After a coat had been polymerized, the platform descends by a single layer thickness and a subsequent layer pattern is traced, adhering to the previous layer. A complete 3-D object is formed by this process.

Laser sintering (LS) uses a high power laser or another focused heat source to sinter or weld small particles of plastic, metal, or ceramic powders into a mass representing the 3-dimensional object to be formed.

Fused deposition modeling (FDM) and related techniques make use of a temporary transition from a solid material to a liquid state, usually due to heating. The material is driven through an extrusion nozzle in a controlled way and deposited in the required place as described among others in U.S. Pat. No. 5,141,680.

Foil-based techniques fix coats to one another by means of gluing or photo polymerization or other techniques and cut the object from these coats or polymerize the object. Such a technique is described in U.S. Pat. No. 5,192,539.

Typically RP&M techniques start from a digital representation of the 3-D object to be formed. Generally, the digital representation is sliced into a series of cross-sectional layers which can be overlaid to form the object as a whole. The RP&M apparatus uses this data for building the object on a layer-by-layer basis. The cross-sectional data representing the layer data of the 3-D object may be generated using a computer system and computer aided design and manufacturing (CAD/CAM) software.

The fixation component and locators of the invention may be manufactured in different materials. In a particular embodiment, the material is nylon. Other typical materials include but are not limited to laser sinterable materials, pulvurent materials that can be used in an additive manufacturing technology, pulvurent thermoplastic materials with a sharp thermal transition, allowing the use in a laser sinter process, pulvurent thermoplastic materials with a sharp thermal transition, that can be selectively melted into a 3D object via a layerwise partial or full melting process, thermoplastic materials suitable to be used in a Additive Manufacturing process via selective deposition of small extruded wires or wire-shaped thermoplastic materials that can be selectively deposited in an Additive Manufacturing process. As used herein, sharp thermal transition refers to a physical transition based upon a change in crystallinity and/or a change from glassy state to polymer melt that occurs over a limited temperature domain.

In particular embodiments, the locators according to the invention are produced by metal sintering.

In particular embodiments the locators, and more particularly the fixation component or one or more parts thereof are reinforced with a sheath or insert of a highly durable material such as a metal plate or coated surface. In more particular embodiments of the present invention, the locking element of the fixation component comprises a metal plated or coated surface. This ensures increased durability while maintaining flexibility. A metal plated surface can be obtained by a metal plating process. A coated surface can be obtained in different ways known to the skilled person. In particular embodiments the coating is obtained by the application of a thin layer of UV curable coating layer on the surface and hardening the coating layer using ultraviolet light.

A further aspect of the invention provides fixtures, i.e. supporting and/or reference constructions for supporting and positioning and/or calibrating a piece, which comprises a locking feature present on the piece. More particularly, the fixtures or supporting and/or reference structures according to the invention comprise one or more locators comprising one or more fixation components according to the invention. More particularly the supporting and/or reference constructions comprise a base structure and one or more structural elements, wherein at least one of the structural elements comprises a locator comprising one or more fixation components as described herein.

Supporting and/or reference constructions comprising different structural elements and one or more locators are known in the art. They typically comprise a base structure which can be a plate or one or more bars, with structural elements provided thereon. Examples of structural elements include bars and plates, typically somewhat smaller in size than those of the base structure. These structural elements are positioned at different locations on the base structure such as to support the piece, optionally in a specific position (e.g. to allow processing and/or control of said piece). WO0211945 describes methods for manufacturing support and/or reference constructions based on a digital image of the piece of interest.

The supporting and/or reference constructions according to the present invention comprise one or more locators comprising a fixation component as described herein which allow fixation of the piece in a position which mimics the fixation of the piece in the final assembly. This allows not only more accurate measurement, testing and assembly of the piece as a whole but in addition allows testing of the interlock mechanism prior to assembly, with a minimal time investment.

In particular embodiments, the supporting and/or reference constructions according to the invention are, characterized in that the position of the structural elements which comprise the locators is determined based on a digital description of said piece and optionally, a desired positioning thereof. Typically a supporting and/or reference construction will comprise both structural elements comprising a locator which does not comprise the fixation component according to the invention and structural elements comprising a locator which does comprise one or more fixation components. A structural element comprising a locator not comprising a fixation component according to the invention typically comprises one or more mating surfaces which mates with a (specific) surface of the piece. Thus these elements support the piece and may help maintain the position of the piece, but they do not allow a reversible interlock with the piece.

Accordingly, the present invention further provides methods for producing supporting and/or reference constructions according to the invention, which are capable of reversibly holding an object in a desired position, e.g. a position mimicking the position of the object in its final assembly. In particular embodiments, the methods comprise the steps of:
- obtaining a three-dimensional image of an object comprising an locking feature, e.g. a male or a female portion of an interlock mechanism and its desired position,
- designing one or more locators comprising a fixation component integrated therein with a locking element configured for reversibly locking with the locking feature present on the object (i.e. receiving the male portion, respectively latching into the female portion of an interlock),
- optionally designing one or more mating surfaces on said one or more locators which mate with a (specific) surface of the object, and
- designing a supporting and/or reference structure with structural elements supporting the one or more locators, such that the one or more locators can hold the object in a desired position, when the locking feature(s) present on the object (is)are interlocked with the respective fixation component(s) of the one or more locators.

Yet a further aspect of the present invention relates to the applications of the fixation components and fixtures comprising the locators described herein.

In particular embodiments the use of locators comprising one or more fixation elements as described herein is provided for holding an object or piece comprising a locking feature which is typically either a male portion or a female portion of an interlock mechanism by way of this locking feature. The fixture and/or locator tightly secures the portion of the interlock present on the piece and thus ensures that the piece is held, and optionally fixed in place, but can be removed when required In particular embodiments this can be ensured without applying force on the object. Typically the locators of the present invention are used for the inspection, calibration, checking, assembly and/or any other processing of objects in production lines. In a particular embodiment, the use of the fixation elements and fixtures and/or locators of the present invention is provided for quality control measurements in production lines such as in the automotive or aeronautic industry. Thus methods for use of the locators of the present invention include methods for processing a piece of interest which comprise fixing the piece of interest on the locator in the desired position and inspecting, calibrating, checking, assembling or processing the piece.

In particular embodiments use is made of supporting and/or reference structures comprising the locators described herein.

In particular embodiments, the invention provides methods for reversibly mounting, and optionally measuring and/or performing quality control of an object comprising a locking feature (which is typically one or more male or female portions of interlock mechanisms on a fixture), optionally in a fixed position.

In particular embodiments, the methods of the invention comprise the steps of mounting the object on the supporting and/or referencing structure which is designed to allow releasable fixation of the object in a desired position and performing the required measurements or other manipulations on or with the object. The fixation component present on the locators according to the invention allows the release of the object thereafter and a repeated mounting of the object such that reproducible measurements can be ensured.

The steps of mounting and demounting of the object from the supporting and/or referencing structure, more particularly from the locators comprising one or more fixation components integrated therein typically comprise:
- inserting or engaging the portion of the interlock provided on the object into or with the locking element provided on the locator thereby connecting the object to the fixture. This step typically requires applying pressure on the object as a whole to ensure the snap-fit, and after having performed the necessary measurements and/or manipulations,
- actuating the release element thereby releasing the respective portion of the interlock present on the object from the locking element, and
- removing the object from the fixture.

In order to better explain the characteristics of the invention, the following particular embodiments of fixating component for fixtures and/or locators are described as examples only without intending to be limitative in any way.

EXAMPLES

Example 1

Figure 1:
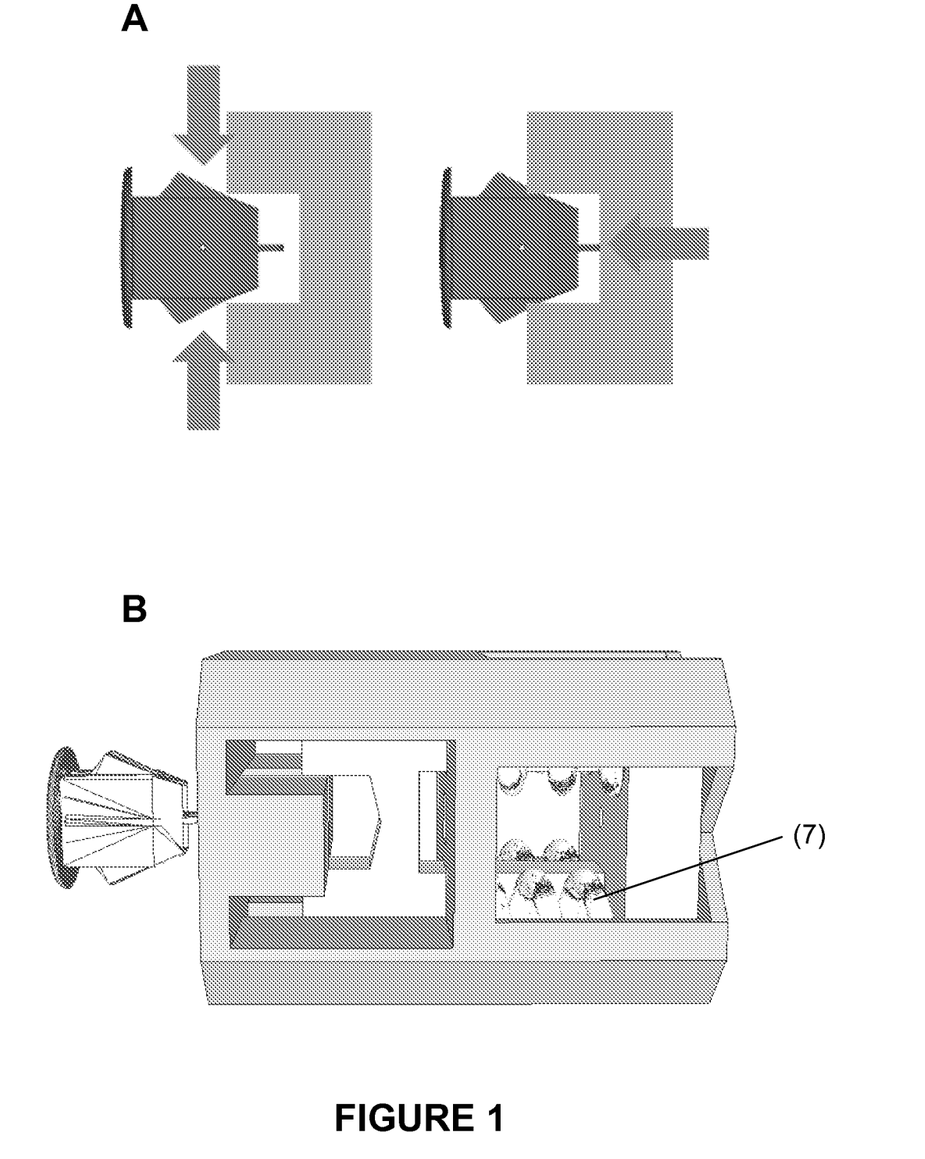

This example describes a fixating component developed for a clip fastener according to a particular embodiment of the invention. In the illustrated embodiment (FIGS. 1 and 2), the male portion of the interlock mechanism is part of a fastener and the locking element is designed to reversibly lock the male portion of the interlock. This is again schematically illustrated in FIG. 2. The male portion (A) of the clip fastener interlock mechanism is characterized by the presence of an at least partly hollow tongue portion (a), two wedges (b) and a cap (c). The cap is typically larger in size than the tongue and than the opening of the corresponding female portion of the interlock, which is designed to allow passage of the tongue portion only. Upon introducing the male portion through the opening of the female portion of the interlock, the wedges are pushed into the cavity of the tongue portion. Inside the hollow of the female portion, the wedges resiliently return to their original position and function as hooks such that the tongue portion (a) can no longer slide out of the opening of the female portion.

Figure 2:
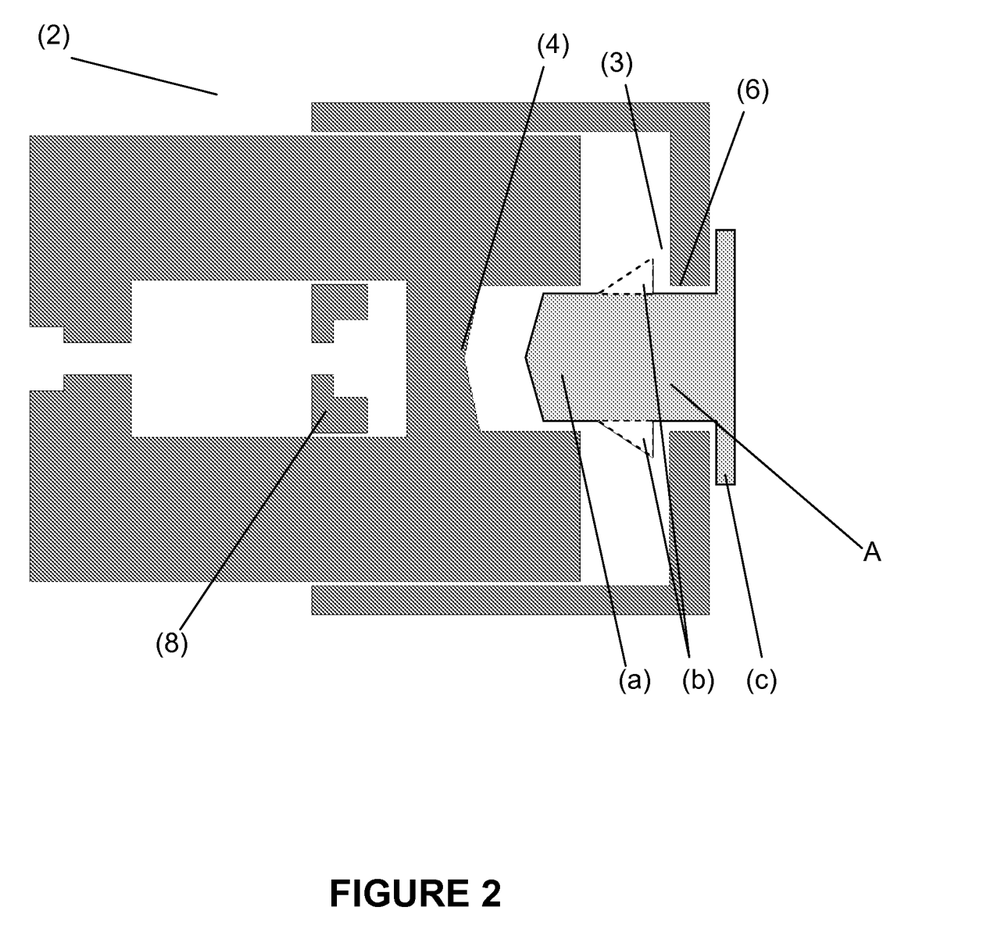
FIG. 2 represents a transverse section of the locator with fixation means illustrated under FIG. 1 (B) comprising a locking element (3) and releasing element (4).

Accordingly, FIG. 2 illustrates a fixating component according to a particular embodiment of the invention. The fixation component (2) comprises a locking element (3) and a release element (4). The locking element (3) comprises an opening (5) (not visible in the side view of FIG. 1) for insertion of the male portion (A). The locking element (3) further comprises a ridge (6) which is formed by the opening. The release element (4) comprises a spring (7) (not visible in the side view of FIG. 1) and movable member (8).

The fixation component displayed in FIG. 1B consists of a built-in spring system that makes a two-way linear action possible with only one-way force input.

Different types of force input can be provided to drive the release mechanism of the fixation component.

Example 2

In this example, the locators according to a particular embodiment of the present invention are integrated into a supporting and/or reference construction, also referred to generally as a fixture.

Figure 3:
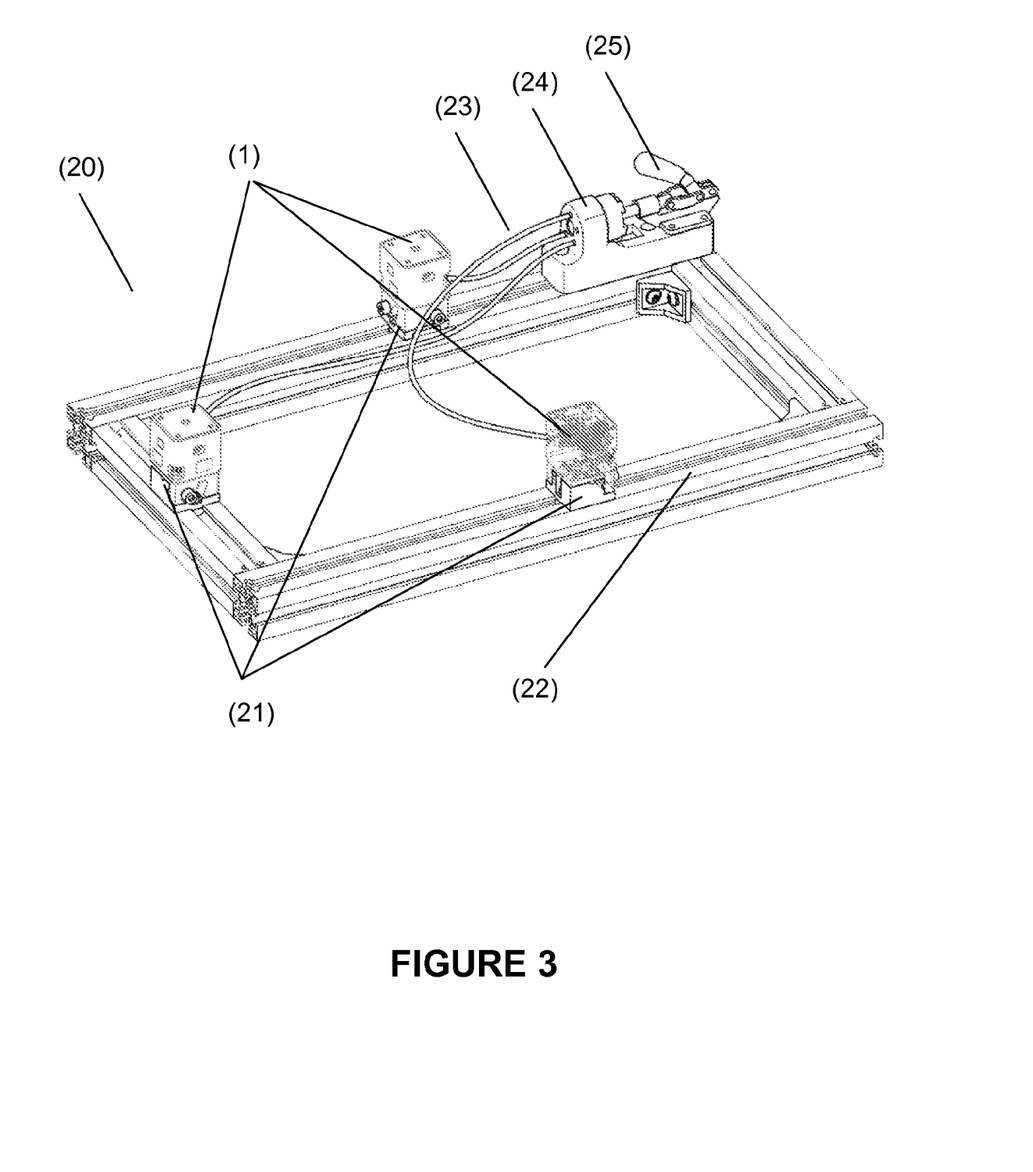
FIG. 3 represents a three dimensional representation of a supporting and/or reference construction according to a particular embodiment of the invention. The release elements of the different locators are connected to a central module providing a force input operable by a lever.

This is illustrated in FIG. 3 in which a supporting and/or reference construction (20) according to a particular embodiment of the invention is illustrated, wherein several locators (1) comprising fixation component (not shown) are provided by way of supporting structures (21) positioned on a base structure (22). The release element of the fixation component integrated in the locators (1) is connected through a mechanical cable system (23) to a control box (24) with a lever (25), which can provide a mechanical force input.

Example 3

Figure 4:
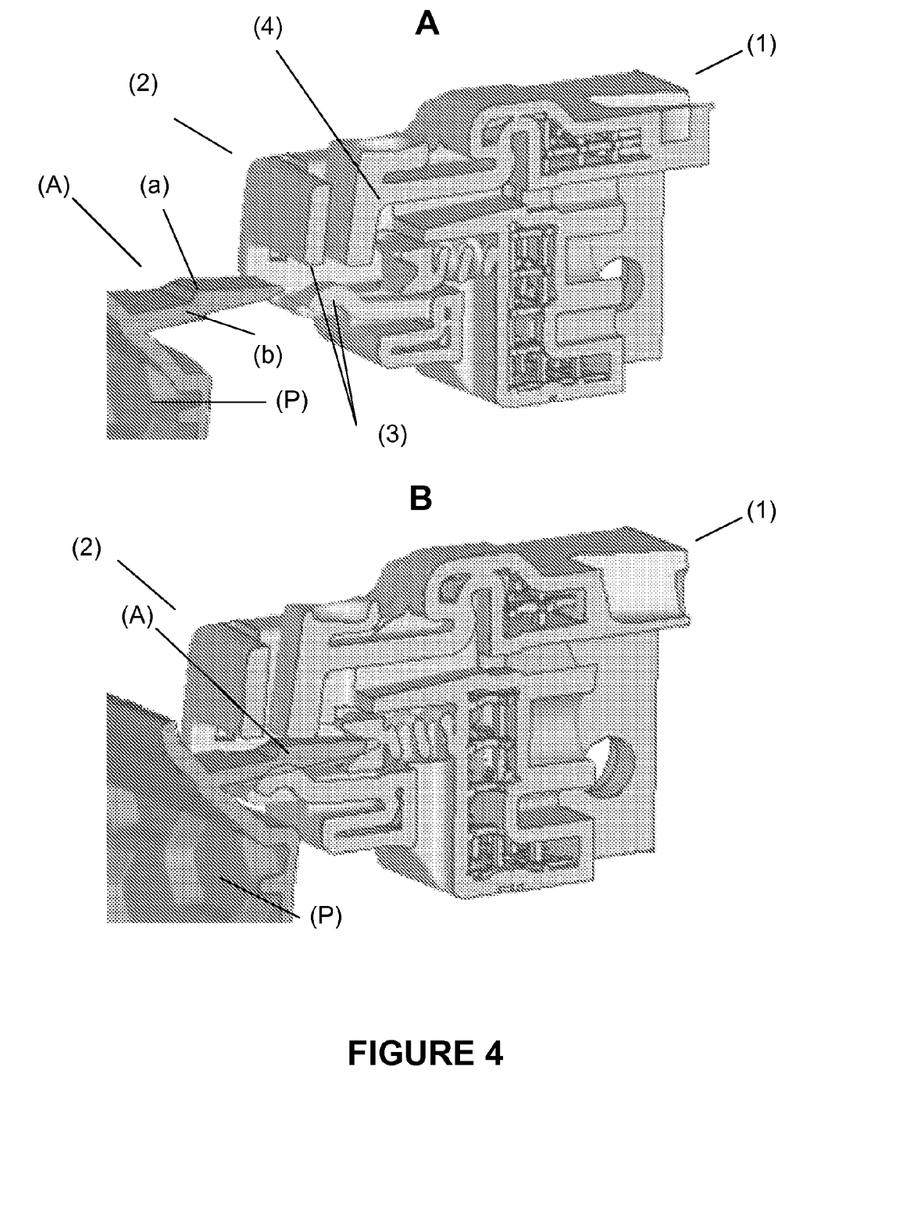
FIG. 4 illustrates a transversal section of a locator comprising an integrated fixation means according to a particular embodiment of the invention, whereby the interlock mechanism is a snap-fit. Panel A shows the locator before the male portion (A) has been introduced into the locking component of the locator. Panel B shows the locator when the male portion is held by the locking component.

This example describes a fixating component developed for a snap-fit fastener according to a particular embodiment of the invention, whereby the object comprises the male portion of the interlock. FIGS. 4A and 4B illustrate a locator (1) comprising a fixating component (2). In FIG. 4, the male portion (A) of the snap-fit is illustrated as part of an object (P). The male portion comprises a tongue (a) provided with a wedge (b) which functions as a hook. The fixation component comprises a locking element (3) with an opening which allows insertion of the male portion of the interlock mechanism. In the embodiment illustrated in FIG. 4, the release element (4) comprises a lever, which can be manually actuated to release the wedge of the male portion.

Example 4

Figure 5:
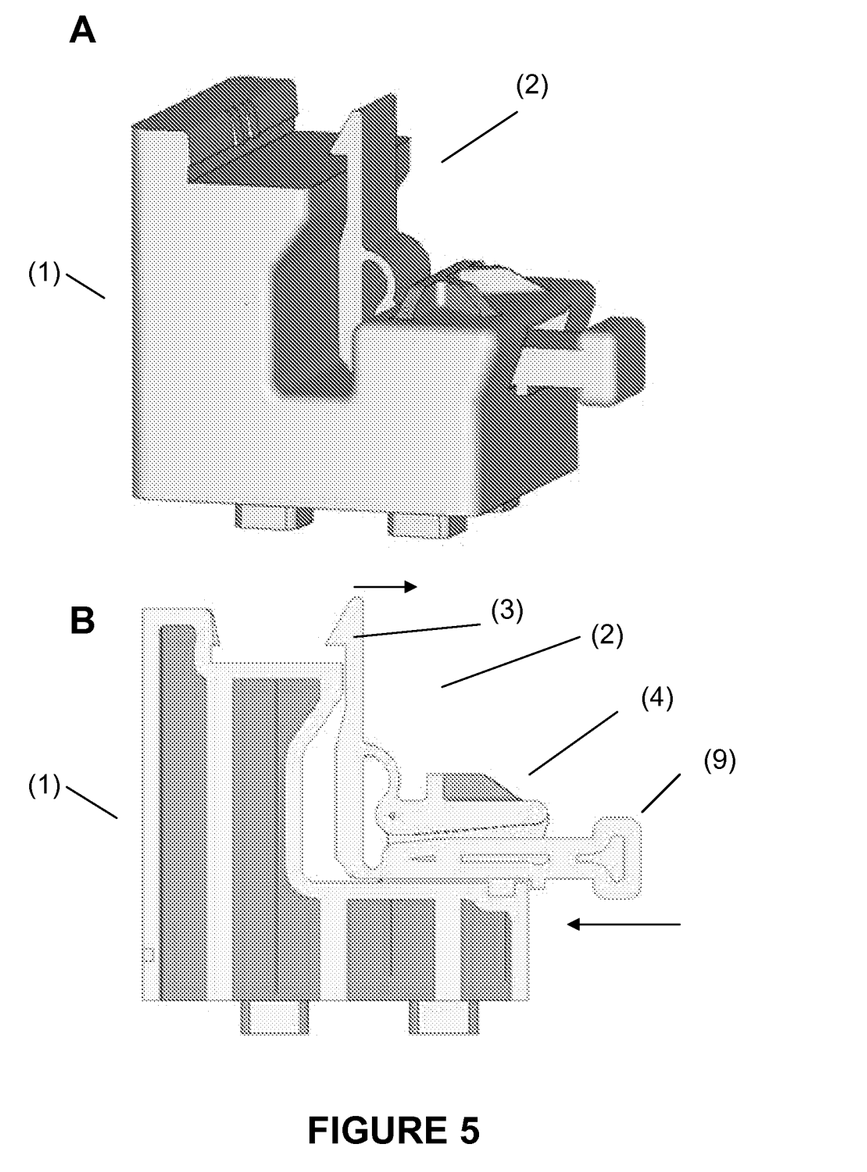
FIG. 5 shows a top view (A) and a transversal section of a locator with integrated fixation means according to a particular embodiment of the invention, wherein the release element is operable by a lever.

This example describes a fixating component developed for a snap-fit fastener according to a particular embodiment of the invention, whereby the object comprises the female portion of the interlock. Accordingly, in this embodiment the locking element is designed to correspond in part to the male portion of the interlock. FIGS. 5A and 5B illustrate respectively a perspective and cross-section view of a locator (1) according to a particular embodiment of the invention comprising a fixating component (2). The locking element (3) is designed to engage in the female portion of the interlock mechanism present on the object. In the embodiment illustrated in FIG. 5, the release element (4) comprises a lever, which can be manually actuated to move the position of the locking element such that it releases from the interlock with the female portion (actuation ensures movement in the direction of the arrows).

Example 5

Figure 6:
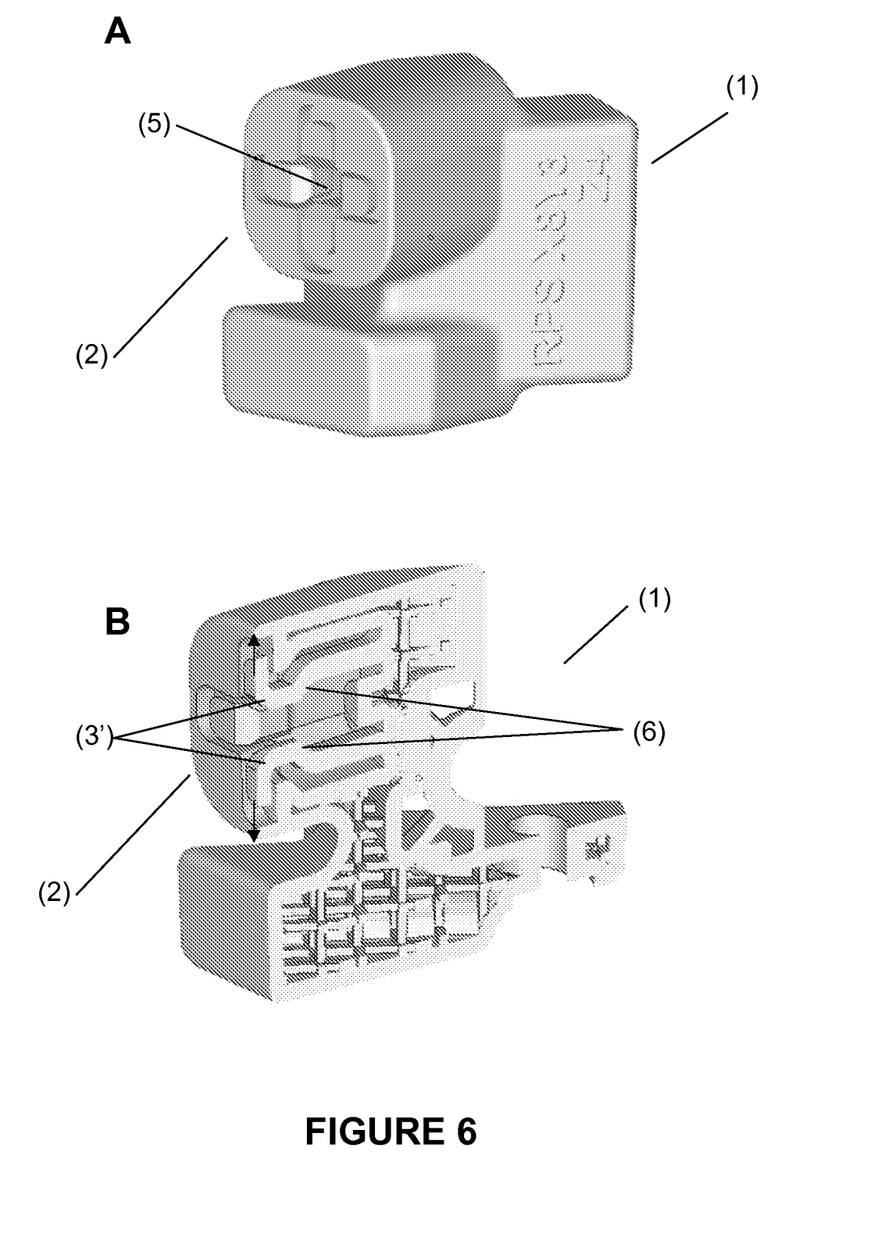
FIG. 6 represents a view in perspective (A) and the cross-section (B) of a locator comprising an integrated fixation means according to a particular embodiment of the invention wherein the fixation means comprises a locking element with integrated releasing element.

This example, illustrated by FIG. 6 provides a locator (1) comprising a fixating component according to a particular embodiment of the invention. The fixation component (2) comprises a locking element with the release element integrated therein. It comprises an opening (5) for insertion of the male portion (A) and a ridge (6) which is formed by the opening (5). The ridge however is formed by two or four springs which can be compressed by pushing of the male portion in either direction along its axis, i.e. when either introducing into or removing the male portion from the fixation component.

In the embodiment illustrated in FIG. 6, the fixation component present on the locator comprises four springs oriented in two perpendicular directions, limiting movement of the male portion after introduction thereof into the fixation component. In alternative embodiments, the fixation component may comprise only two springs located opposite each other, fixing the male portion only in one direction.

The locator illustrated in FIG. 6 further comprises an opening which allows mounting of the locator onto a fixture or a structural element thereof.

Figure 7:
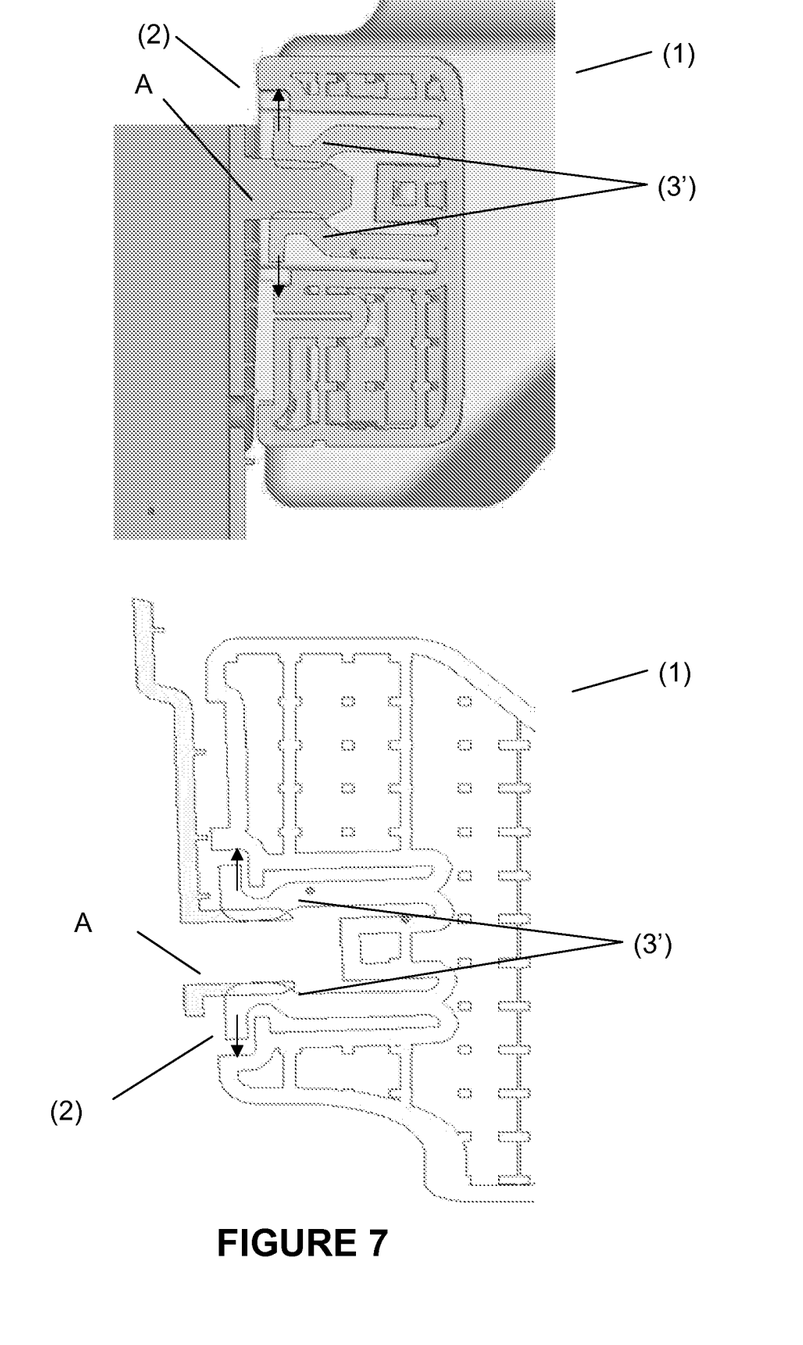

FIG. 7 illustrates a cross-section view of a fixation component (2) which forms an integral part of a locator (1), which fixation component comprises as a locking element (3') having a releasing element integrated therein, a set of springs which are compressed by pushing of the male portion (A) in either direction along the axis of the male portion.

Example 6

Figure 8:
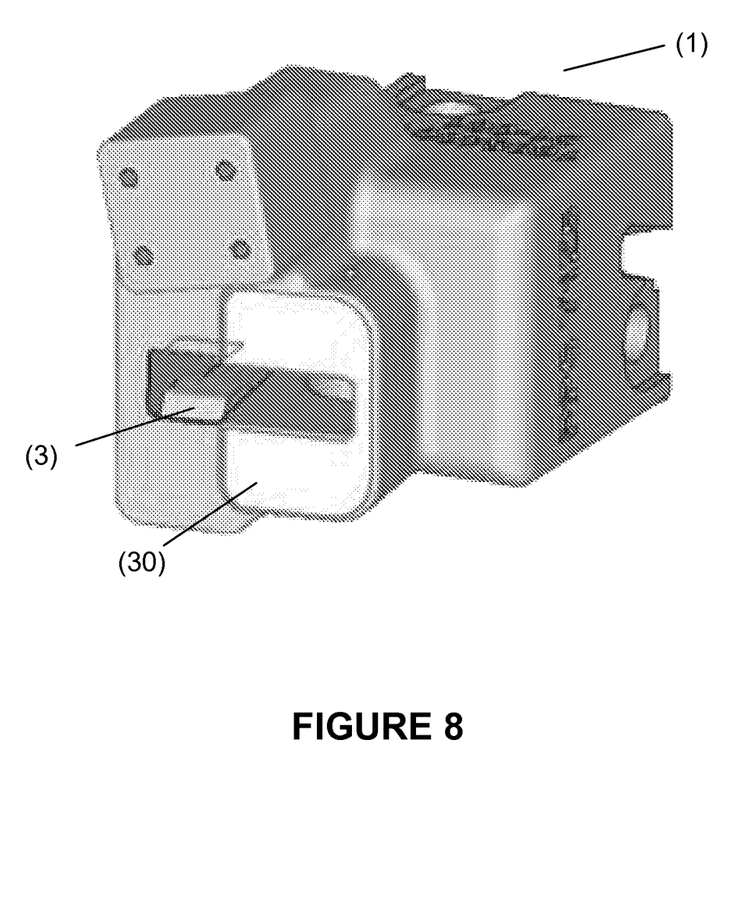
FIG. 8 represents a perspective view of a locator according to a particular embodiment of the invention comprising a reference surface which mates with a surface of the piece which is to be held by the fixation component integrated in the locator.
Figure 9:
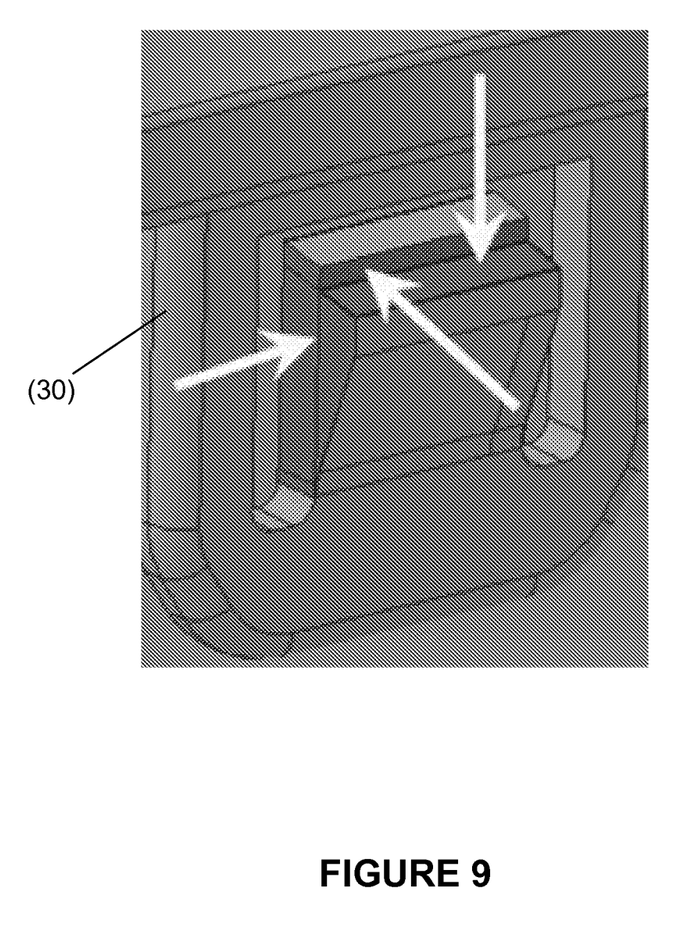
FIG. 9 represents a view of a locking element of a piece and surfaces thereon which can be used to design the mating surface.

This example, illustrated by FIG. 8 provides a locator (1) comprising an integrated fixating component according to a particular embodiment of the invention comprising as a locking element (3), which further comprises a surface (30), which is a reference surface on which the piece which is to be held will rest. This reference surface is pre-determined and determines the position in which the piece is held by the fixture.

The invention claimed is:

1. A method for manufacturing a locator for at least one of supporting or positioning a piece comprising a locking feature in a fixture, said method comprising the steps of:
    obtaining a three-dimensional image of a piece in a given orientation,
    determining at least one reference surfaces on the three-dimensional image,
    designing a locator comprising one or more mating surfaces which mate with the at least one reference surface and a fixation component capable of tightly but reversibly holding the piece by a locking feature, based on the at least one reference surface; and
    manufacturing said locator by additive manufacturing.

2. The method of claim 1, wherein said locking feature is the male or female portion of an interlock mechanism.

3. The method of claim 2, wherein said interlock mechanism is at least one of a spring fastener, snap-fit, click fingers, snap lock, snap clip mechanism, plastic clip, push-in clips, push-in fastener, arrow clip, grommet, rivet, removal rivet, or snap rivet.

4. The method of claim 1, wherein said fixation component is releasable by a force input acting on said fixation component.

5. The method of claim 4, wherein said force input is a pneumatic, hydraulic, mechanical, electrical or electro-magnetic force.

6. The method of claim 1, wherein said fixation component comprises a locking element with an integrated releasing element.

7. The method of claim 1, wherein the locator further comprises a fixture-placement feature for attachment to a fixture.

8. The method of claim 1, wherein manufacturing said locator comprises manufacturing said locators as one integral piece by additive manufacturing.

9. The method of claim 1, wherein one or more parts of said fixation component are reinforced with either a highly durable material, an insert, or by local hardening.

10. The method of claim 1, wherein the locator comprises one or more reference surfaces on which the piece is configured to rest or which further fix the piece in a specific position, the one or more reference surfaces being pre-determined and configured to determine the specific position.

11. The method of claim 1, wherein the locator comprises a mating surface configured to specifically mate with the piece in a unique position of the piece relative to the locator so as to constrain movement of the piece relative to the locator.

12. A method for providing at least one of a supporting or reference construction capable of reversibly holding an object comprising a locking feature in a desired position comprising the steps of:

obtaining a three-dimensional image of the object, determining at least one reference surface on the three-dimensional image, designing one or more locators comprising a fixation component integrated therein with a locking element configured for reversibly locking with the locking feature present on the object, designing one or more mating surfaces on said one or more locators which mate with the at least one reference surface, designing at least one of a supporting or reference structure with structural elements supporting the one of more locators, such that the one or more locators can hold the object in a desired position, manufacturing said one or more locators by additive manufacturing; and providing at least one of a supporting or reference construction comprising said one or more locators.

13. The method of claim 12, wherein the at least one of a supporting or reference construction is configured for at least one of supporting or positioning a piece comprising a base structure and one or more structural elements, wherein at least one of said structural elements comprises or contains attached thereto a locator.

14. The method of claim 12, wherein the position of said at least one supporting or reference structures is determined based on a digital description of said object.

* * * * *